United States Patent
Masai et al.

[11] 3,928,283
[45] Dec. 23, 1975

[54] FIREPROOF, THERMOPLASTIC POLYESTER COMPOSITION

[75] Inventors: Yukito Masai, Otsu; Yasuo Kato, Shiga; Ken Murayama, Iwakuni; Nobuhiko Fukui, Otsu, all of Japan

[73] Assignee: Toyo Boseki Kabushiki Kaisha (Toyo Spinning Co., Ltd.), Japan

[22] Filed: Mar. 9, 1971

[21] Appl. No.: 122,367

[30] Foreign Application Priority Data
Mar. 9, 1970 Japan.................................. 45-19880

[52] U.S. Cl............ 260/45.7 P; 260/2 P; 260/40 P; 260/75 P; 260/860; 260/DIG. 24
[51] Int. Cl.².......................................... C08K 5/53
[58] Field of Search.......... 260/75 P, 40 P, DIG. 24, 260/930, 75 P, 40 R, 860, 45.7 P, 2 P

[56] References Cited
UNITED STATES PATENTS
3,053,795  9/1962  Coover et al............... 260/45.7 P X Primary Examiner—Donald E. Czaja
Assistant Examiner—S. M. Person
Attorney, Agent, or Firm—Craig & Antonelli

[57] ABSTRACT
A fireproof, thermoplastic polyester composition which comprises a polyester and a polyaryl phosphonate incorporated therein in an amount of 0.7 to 4.0 weight % as phosphorus to the polyester, the said polyaryl phosphonate being not less than 6 in the degree of polymerization and containing as its diol component at least one of the aromatic diol compounds of the formulae:

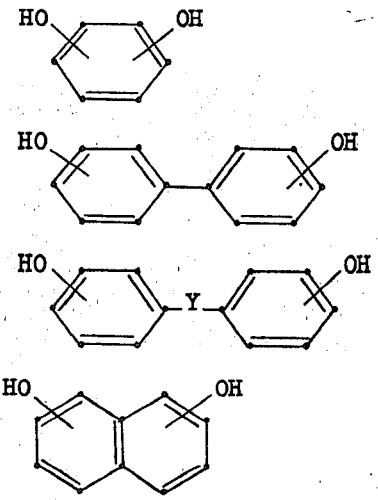

wherein Y is alkylidene or cycloalkylidene having 1 to 6 carbon atoms and the benzene ring may bear one or more alkyl(s).

5 Claims, 1 Drawing Figure

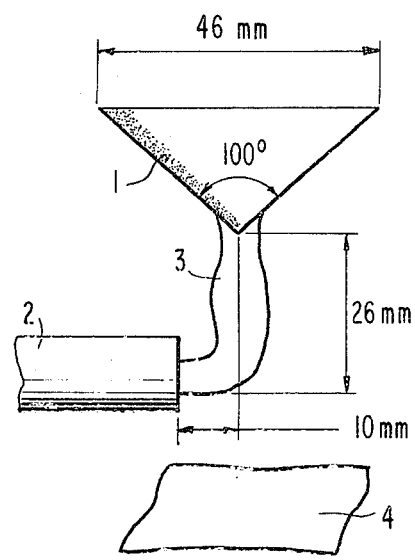

FIREPROOF, THERMOPLASTIC POLYESTER COMPOSITION

The present invention relates to a polyester composition having a fireproof property. More particularly, it relates to a fireproof, thermoplastic polyester composition which can be melt moulded without any material decrease in the degree of polymerization.

Thermoplastic polyesters are widely used in production of fibers, films and the like. However, most of them, e.g. polyethylene terephthalate, are inflammable so that their acquisition of a fireproof property is highly demanded.

For giving a fireproof property to polyesters, various compounds such as halogen compounds, phosphorus compounds and metal compounds have heretofore been incorporated into polyesters. Among them, esters of phosphoric acid, phosphorous acid and phosphonic acid containing or not halogen atoms afford a relatively high fireproof property to polyesters. However, when a polyester incorporated with such ester is subjected to melt moulding, for example, melt spinning, ester exchange takes place between the polyester and the ester whereby the polymerization degree and the melt viscosity of the polyester are lowered. Consequently, spinning can hardly be performed, or even if performed, the resulting filaments are inferior in the quality and meet troublesome problems on the practical use.

The thermoplastic polyester composition according to the present invention comprises a polyester and a polyaryl phosphonate incorporated therein in an amount of 0.7 to 4.0 weight % as phosphorus to the polyester, the said polyaryl phosphonate being not less than 6 in the degree of polymerization and containing as its diol component at least one of the aromatic diol compounds of the formulae:

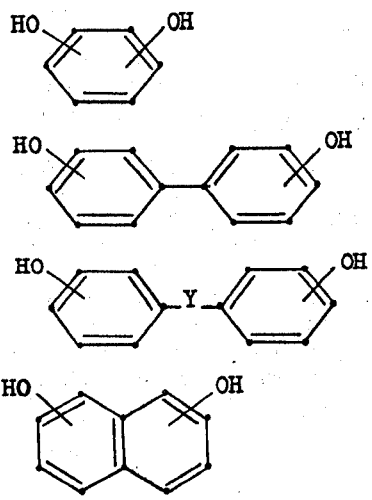

wherein Y is alkylidene or cycloalkylidene having 1 to 6 carbon atoms (e.g. methylene, isopropylidene, cyclohexylidene) and the benzene ring may bear one or more alkyl(s). Though the polyester composition includes a phosphorus compound, it is scarcely lowered in the degree of polymerization and deteriorated in other physical and chemical properties on melt moulding.

The said polyaryl phosphonate can be prepared by reacting at least one of the aromatic diol compounds [I] to [IV] with a compound of the formula:

wherein R is aryl (e.g. phenyl, tolyl, xylyl, naphthyl) and X is chlorine or bromine. The reaction may be executed by heating a mixture of these reactants in approximately equimolar amounts at 100° to 200°C under atmospheric pressure and then at 150° to 250°C under atmospheric or reduced pressure in an inert gas or dry air, preferably in the presence of a catalyst such as magnesium chloride or calcium chloride. Alternatively, the reaction may be carried out by surface polymerization of the compound dissolved in a solvent such as methylene chloride with at least one of the aromatic diol compounds [I] to [IV] as alkali metal salt(s) dissolved in water while stirring.

Examples of the aromatic diol compounds [I] to [IV] are hydroquinone, resorcinol, 4,4'-dihydroxybiphenyl, 4,4'-methylenebisphenol, 4,4'-ethylidenebisphenol, 4,4'-isopropylidenebisphenol, 4,4'-cyclohexylidenebisphenol, 2,2'-methylenebisphenol, 1,5-dihydroxynaphthalene, 2,7-dihydroxynaphthalene, etc.

Examples of the compound [V] are phenyldichlorophosphine oxide, phenyldibromophosphine oxide, etc.

The polyaryl phosphonate to be used in this invention is required to be not less than 6 in the degree of polymerization when calculated from the molecular weight which is determined by the vapor pressure osmometry using chloroform as solvent at 35°C. Particularly preferred is the one, of which the degree of polymerization is 10 or more. When the degree of polymerization is below 6, the polyaryl phosphonate is not stable and the viscosity of the polyester incorporated therewith is considerably lowered.

In the composition of the invention, the amount of the polyaryl phosphonate is 0.7 to 4.0 weight %, preferably 0.8 to 3.0 weight % as phosphorus to the polyester. The incorporation of the polyaryl phosphonate into the polyester is preferably carried out after the polycondensation of the polyester is completed.

According to this invention, various thermoplastic polyesters can be made non-inflammable. For example, polyethylene terephthalate, fiber-forming copolymerized polyester containing not less than 80 mol % of ethylene terephthalate unit, poly-1,4-cyclohexylidenedimethylene terephthalate, polyethylene sebacate, polyethylene adipate and the like are advantageously provided with a fireproof property.

On the incorporation of the polyaryl phosphonate into the polyester for melt spinning, it is desirable to place the former under the melt condition as shortly as possible. Further, it is favorable to add the polyaryl phosphonate to the polyester after completion of the polymerization and just before the spinning. When the addition is performed at the beginning or middle stage of polymerization, coloring of the polyester may be caused, and the completion of the reaction will be delayed. The addition at the final stage of polymerization may lower the viscosity of the polyester and will increase the coloring of the product by ultraviolet ray.

The polyaryl phosphonate may be employed in the form of pellet. For preparation of pellets, the polyaryl phosphonate is melt polymerized, extruded out of a nozzle at the bottom of the reaction vessel under the pressure of nitrogen and cut while hot to give pellets. Alternatively, a solution of the polyaryl phosphonate in a soluble solvent (e.g. chloroform, tetrachloroethane) is poured into an insoluble solvent (e.g. methanol) and the precipitated powder is moulded in pellets, after tableted as the case may be, by the aid of an extruder.

The mixture of the polyester and the polyaryl phosphonate may be subjected to melt spinning as such or preferably after moulded in pellets by the aid of a pelletizer to give filaments, which are scarcely colored or lowered in the degree of polymerization and hardly colored by ultraviolet ray. Still, the polyaryl phosphonate may alternatively be incorporated into the polyester in a melted state during spinning.

The polyester composition of the present invention possesses an excellent fireproof property and shows a good affinity to cationic dyes and dispersion dyes and a sufficient pilling resistance after dyeing at high temperature and bleaching.

Practical and presently preferred embodiments of the present invention are illustratively shown in the following Examples wherein parts are by weight.

In these Examples, the intrinsic viscosity of the polyester is measured in a phenol-tetrachloroethane mixture (3 : 2) at 30°C. The non-inflammability is estimated using an apparatus shown in FIG. 1 of the attached drawing in the following manner:

(1) The flame-remaining time and the ratio of unburnt residue: — The test composition (1 g) in powder of about 20 mesh is charged in a conical vessel (1) made of stainless steel wire No. 36 (50 mesh). The bottom of the vessel is contacted for 20 seconds with a butane gas flame (3) containing air which is introduced from a hole of 2 mm in diameter by the use of a microburner (2) of 6 mm in hole diameter. The shape of the vessel, the bulk of the flame and the distance between the bottom of the vessel and the flame are as shown in FIG. 1. The temperature of the upper part of the flame which is contacted with the vessel is about 750°C. A part of the test composition is melted and drops into an aluminum foil (4). The unburnt residue present in the wire vessel and in the aluminum foil is weighed, and the ratio by weight % to the initial weight of the test composition as well as the flame-remaining time after removal of the fire are used for estimation of the non-inflammability.

(2) The coil method: — A plain fabric of filaments made of the test composition and being 10 cm in width and 1 g in weight is rolled and inserted into a supporting coil made of hard stainless steel and being 10 mm in inner diameter, 2 mm in interval and 15 cm in length. The coil is hung in a draftproof chamber at an angle of 45°. The test composition is ignited with a burner set up in such a manner that the top of the flame of 45 mm in length is contacted with the bottom of the test composition. As the fuel, liquefied petroleum gas is employed. Ignition is continued until the combustion of the test sample ceases. Then, the coil is contacted with the flame until the lower part of 9 cm in the length of the test sample is completely burnt. When the contact times with the flame are 3 or more, the non-inflammability of the test sample is regarded as satisfactory.

(3) The oxygen index $n$: — According to the oxygen index method described in ASTM D-2863-70, the oxygen index $n$ is determined using a sheet of plain fabric made of the test composition, being 10 cm in length and 5 cm in width and tightly rolled up in a stick-like shape.

The number average molecular weight of the polyaryl phosphonate is measured by the vapor pressure osmometry at 35°C in chloroform, and the degree of polymerization is determined therefrom.

Preparation of fireproof agents

Procedure 1: — A mixture of phenyl dichlorophosphine oxide (1 mol) and a diol compound (0.96 mol) is heated in the presence of calcium chloride in nitrogen stream at 150°C for 4 hours and then at 180°C for 15 hours. The reaction mixture is further heated under reduced pressure at 200°C for 2 hours to give a fireproof agent.

Procedure 2: — A mixture of hydroquinone (21.6 parts), phenoxydichlorophosphine oxide (42.2 parts) and calcium chloride (0.3 part) is heated in nitrogen stream at 150°C for 19 hours and then at 150°C for 4 hours under reduced pressure to give a fireproof agent as light yellow solid.

Procedure 3: — A phosphorus compound (1 mol) is reacted with 1,4-butanediol (0.96 mol) at room temperature in nitrogen stream for 3 hours and then at 40°C under reduced pressure for 1 hour to give a fireproof agent.

Procedure 4: — A mixture of phenyldichlorophosphine oxide and a diol compound in a molar ratio of 1 : 1.13 is treated in the same manner as in Procedure 1 to give a fireproof agent.

Procedure 5: — A mixture of phenoxydichlorophosphine oxice (0.027 mol), a diol compound (0.025 mol) and calcium chloride (25 mg) is heated in nitrogen stream at 150°C for 2 hours, at 185°C for 2 hours and then at 200°C for 15 hours. After that, the pressure is gradually reduced below 5 mmHg in 4 hours, and the reaction mixture is further heated at 220°C for 90 minutes, at 240°C for 80 minutes and then at 250°C for 60 minutes to give a fireproof agent.

The fireproof agents prepared any one of the above procedures which cover the compounds used in this invention and the comparison compounds and known fireproof agents (i.e. triphenylphosphite and diphenylbenzenephosphonate), all of which are employed in the following Examples, are shown in Table 1.

Table 1

| No. | Diol compound | Phosphorus compound | Melting point (°C) | Degree of polymerization | Phosphorus content (%) | Remarks (Preparation procedure) |
|---|---|---|---|---|---|---|
| A | Hydroquinone | Phenyldichlorophosphine oxide | 120 | 32 | 13.35 | 1 |
| B | Resorcinol | " | 88 | 40 | 13.34 | 1 |
| C | 4,4'-Dihydroxybiphenyl | " | 110 | 16 | 10.00 | 1 |
| D | 4,4'-Isopropylidenebisphenol | " | 105 | 14 | 8.83 | 1 |
| E | 1,5-Dihydroxynaphthalene | " | 195 | 9 | 10.86 | 1*) |
| F | Hydroquinone (0.48 mol) and 4,4'-isopropylidenebisphenol (0.48 mol) | " | 87 | 15 | 10.60 | 1 |
| a | — | Triphenyl | 49 | 1 | | |

Table 1-continued

| No. | Diol compound | Phosphorus compound | Melting point (°C) | Degree of polymerization | Phosphorus content (%) | Remarks (Preparation procedure) |
|---|---|---|---|---|---|---|
| b | — | Diphenyl benzenephosphonate | **) | 1 | | |
| c | 4,4'-Isopropylidenebis(2,6-dichlorophenol) | Phenoxydichlorophosphine oxide | 170 | 7.7 | | 5 |
| d | Hydroquinone | " | 45 | 20 | | 2 |
| e | 1,4-Butanediol | Phenyldichlorophosphine oxide | **) | 9 | | 3 |
| f | " | Phenoxydichlorophosphine oxide | **) | 7 | | 3 |
| g | " | Methyldichlorophosphine oxide | **) | 10 | | 3 |
| h | Hydroquinone | Phenyldichlorophosphine oxide | 105 | 5 | | 4 |
| i | 4,4'-Isopropylidenebisphenol | " | 60 | 3.5 | | 4 |
| j | Hydroquinone (0.565 mol) and 4,4'-isopropylidenebisphenol (0.565 mol) | " | 90 | 4.4 | | 4 |
| k | 4,4'-Isopropylidenebis(2,6-dibromophenol) | Phenoxydichlorophosphine oxide | 194 | 9 | | 5 |

Note:
*) The heat treatment under reduced pressure is carried out at 250°C.
**) Fluid at room temperature.

EXAMPLE 1

Polyethylene terephthalate (intrinsic viscosity, 0.62) prepared by the use of zinc acetate and antimony trioxide as the catalysts is pulverized in powder (below 20 mesh) and admixed with a fireproof agent. The resulting mixture is dried in a glass ampoule at 110° to 120°C under a pressure of 0.1 mmHg for 16 hours. The dried mixture is melted at 275°C in nitrogen stream, stirred for 20 minutes and cooled to give non-inflammable polyethylene terephthalate. The intrinsic viscosity and the non-inflammability are shown in Table 2.

Table 2

| Fireproof agent Kind | Amount (%) | Intrinsic viscosity | Non-inflammability Flame-remaining time (seconds) | Ratio of unburnt residue (%) |
|---|---|---|---|---|
| — | — | 0.61 | 36 | 77 |
| A | 10.0 | 0.62 | 1 | 94 |
| B | 10.0 | 0.61 | 1 | 94 |
| C | 11.0 | 0.62 | 10 | 92 |
| D | 10.0 | 0.61 | 17 | 91 |
| E | 10.0 | 0.61 | 10 | 92 |
| F | 10.0 | 0.60 | 12 | 92 |
| a | 5.5 | 0.50 | | |
| b | 6.5 | 0.50 | | |
| c | 9.2 | 0.51 | | |
| d | 6.3 | gel formation | | |
| e | 5.0 | 0.43 | | |
| f | 5.0 | 0.40 | | |
| g | 5.0 | 0.40 | | |
| h | 10.0 | 0.52 | | |
| i | 5.5 | 0.54 | | |
| j | 10.0 | 0.51 | | |

EXAMPLE 2

Polyethylene terephthalate as in Example 1 is admixed with a fireproof agent and subjected to melt spinning by the aid of an extruder spinning machine where the temperature of the barrel is 270°C and that of the nozzle is 280°C. The retention time in the extruder is about 15 minutes. The obtained filament is stretched on a hot plate at 90°C up to the length of 4.3 times to give yarn of about 84 d, whose physical properties are determined. The noninflammability of the knitting obtained from the yarn is estimated according to the coil method (described in the provision 4-3-4 of the Japanese Fire Law) and is represented by the contact times with the flame required for complete combustion of the test material. The results are shown in Table 3.

TABLE 3

| Fireproof agent Kind | Amount (%) | Properties of yarns Strength at dryness (g/d) | Elongation at dryness (%) | Fireproof property (contact times with flame) |
|---|---|---|---|---|
| — | 0 | 5.32 | 17.8 | 1 |
| A | 7.5 | 5.35 | 14.8 | 6 |
| B | 7.5 | 5.30 | 15.3 | 6 |
| k | 7.5 | 4.28 | 16.6 | 6 |
| d | 7.5 | Spinning can not be performed because of gel formation | | |
| e | 7.5 | | | |
| f | 7.5 | Spinning can not be performed because of snapping of yarns | | |
| g | 7.5 | | | |
| h | 7.5 | | | |

Note: When the fireproof agent k is used, spinning can be executed, but on continuing the spinning for a long period, insoluble impurities are sticked to the filter of the spinning machine to cause clogging.

EXAMPLE 3

Polyethylene terephthalate (intrinsic viscosity, 0.60) is admixed with the fireproof agent A, B or D in an amount of 15 % and is extruded by the aid of an extruder at 270°C to make a film, whose non-inflammability is estimated. The results are shown in Table 4.

Table 4

| Fireproof agent | Non-inflammability Flame-remaining time (seconds) | Ratio of unburnt residue (%) |
|---|---|---|
| — | 36 | 76 |
| A | 0 | 98 |
| B | 0 | 98 |
| D | 0 | 98 |

EXAMPLE 4

Polyethylene terephthalate is admixed with the fireproof agent A and tested as in Example 1. The non-inflammability of the product is shown in Table 5.

Table 5

| Fireproof agent (% as P) | Non-inflammability Flame-remaining time (seconds) | Ratio of unburnt residue (%) |
| --- | --- | --- |
| 0 | 36 | 76 |
| 0.005 | 37 | 76 |
| 0.010 | 38 | 76 |
| 0.050 | 45 | 75 |
| 0.100 | 49 | 75 |
| 0.180 | 51 | 74 |
| 0.500 | 39 | 78 |
| 0.700 | 28 | 86 |
| 0.750 | 23 | 89 |
| 0.800 | 20 | 92 |
| 1.000 | 12 | 93 |
| 1.200 | 2 | 97 |
| 1.250 | 1 | 98 |
| 1.500 | 0 | 98 |
| 2.000 | 0 | 98 |
| 2.500 | 0 | 98 |
| 3.000 | 0 | 98 |

EXAMPLE 5

As in Example 2, polyethylene terephthalate pellets (intrinsic viscosity, 0.66) are admixed with the fireproof agent A or B and subjected to melt spinning and stretching to give yarns. The flowing amount in spinning is 43 g/minute. The production conditions, the physical properties of the yarns and the non-inflammability are shown in Table 6.

Table 6

| Sample No. | | | | IV | |
| --- | --- | --- | --- | --- | --- |
| Intrinsic viscosity of polyethylene terephthalate ($\mu$) | | | 0.66 | 0.66 | 0.67 |
| Fireproof agent | | | A | B | — |
| Amount used (% to weight of polymer) | | | 15 | 15 | — |
| Spinning temperature (°C) | | | 280 | 280 | 292 |
| Stretching rate | | | 3.51 | 3.51 | 3.51 |
| Fineness (d) | | | 3.40 | 3.43 | 3.40 |
| Strength (g/d) | | | 4.20 | 4.19 | 4.53 |
| Elongation (%) | | | 35.5 | 23.5 | 30.4 |
| Melting point (°C) | | | 248 | 246 | 260 |
| Non-inflammability (coil method) (number of times) | | Before refining | 8 | 8 | 1–2 |
| | | After refining | 8 | 8 | 1–2 |
| | | After refining and bleaching | 7 | 7 | 1–2 |
| | | After refining, bleaching and treatment with fluorecent dye | 7 | 7 | 1–2 |
| | | After refining and dyeing | 7 | 7 | 1–2 |
| | | After dry cleaning (10 times) | 8 | 8 | 1–2 |
| | | After washing with soap (10 times) | 8 | 8 | 1–2 |
| Oxygen index (after spinning) | | | 33 | 33 | 21 |

The treatments shown in the above Table are carried out as follows:

Refining:- The yarn is treated with "Noigen EA-120" (nonionic surfactant manufactured by Daiichi Kogyo Seiyaku Co., Ltd.) (2 g/L) with a solution ratio of 1 : 50 at 70°C for 20 minutes, washed with water and dried.

Bleaching with chlorite:- The yarn is treated with sodium chlorite (2 g/L) and 10 % acetic acid (10 ml/L) with a solution ratio of 1 : 30 at 100°C for 60 minutes and washed with water. Then, the product is treated with sodium bisulfite (2 g/L) with a solution ratio of 1 : 50 at 70°C for 20 minutes, washed with water and dried.

Treatment with fluorescent dye:- The product obtained by treatment with chlorite is treated with "Mikawhite ATconc" (fluorescent dye manufactured by Mitsui Chemical Co., Ltd.) (1.5 % owf) and "Disper TL" (anionic surfactant manufactured by Meisei Chemical Co., Ltd.) (1 g/L) with a solution ratio of 1 : 30 at 120°C for 60 minutes, washed with water and dried.

Dyeing with dispersion dye:- The refined yarn is treated with "Resorcin Blue FBL" (dispersion dye manufactured by Bayer A.G.) (1 % owf) and "Disper TL" (1 g/L) with a solution ratio of 1 : 40 at 120°C for 60 minutes. Then, the product is further treated with hydrosulfite (2 g/L), sodium hydroxide (2 g/L) and "Amyladin" (anionic surfactant manufactured by Daiichi Kogyo Seiyaku Co., Ltd.) with a solution ratio of 1 : 50 at 80°C for 20 minutes, washed with water and dried.

Dry cleaning:- The yarn is treated with Perclene containing "Neuron NP 85" (nonionic surfactant manufactured by Takemoto oils and fats Co., Ltd.) (10 g/L), "AD-800" (anionic surfactant manufactured by Takemoto oils and fats Co., Ltd.) (10 g/L) and water (1 ml/L) at 30°C for 30 minutes and dried in an atmosphere.

Washing with soap:- The yarn is washed with a 0.3 % solution of soap with a solution ratio of 1 : 50 at 60°C for 10 minutes by the aid of a washing machine, washed with water, dehydrated and dried in hot air at 80°C.

EXAMPLE 6

The yarn obtained in Example 5 is immersed in a dyeing bath containing a cationic dye (2 % owf), acetic acid (1.5 % owf) and "Emal-O" (anionic surfactant manufactured by Kao Soap Co., Ltd.) (1 g/L) with a solution ratio of 1 : 50 at 120°C for 60 minutes. Then, the product is further immersed in a dyeing bath containing hydrosulfite (2 g/L), sodium hydroxide (2 g/L) and "Amyladin" (anionic surfactant manufactured by Daiichi Kogyo Seiyaku Co., Ltd.) (2 g/L) with a solution ratio of 1 : 50 at 80°C for 20 minutes, washed with water and dried. The dyeing results are shown in Table 7.

Table 7

| Cationic dye | Manufactured by | IV | VI |
| --- | --- | --- | --- |
| Maxilon brilliant flavine 10GFF | Geigy A.G. | Moderate | Stained |
| Astrazone orange (CI Basic orange 27) | Bayer A.G. | Moderate | Stained |
| Aizen katiron brilliant pink BH (CI Red 36) | Hodogaya Kagaku Co., Ltd. | Moderate | Stained |

Table 7-continued

| Cationic dye | Manufactured by | IV | VI |
|---|---|---|---|
| Aizen katiron brilliant red 4GH (CI Basic red 14) | Hodogaya Kagaku Co., Ltd. | Moderate | Stained |
| Astrazone blue G (CI Basic blue 1) | Bayer A.G. | Moderate | Stained |
| Maxilon brilliant green 3G | Giegy A.G. | Moderate | Stained |

From the above Table, it is surprisingly noted that the composition of the invention (e.g. test material IV) possesses an affinity to a cationic dye.

EXAMPLE 7

The yarn obtained in Example 5 is subject to dyeing with a dispersion dye in the same menner as in Example 5. The results are shown in Table 8. The coloring degree is estimated from the reflection rate which is determined at 400 to 760 m$\mu$ by a spectrophotometer (manufactured by Hitachi Seisakusho Co., Ltd.).

Table 8

| Test material | X | Y | Z | Reflection rate at 420 m$\mu$ | K/S |
|---|---|---|---|---|---|
| IV | 0.1165 | 0.1078 | 0.3415 | 32.5 | 0.701 |
| VI | 0.1185 | 0.1071 | 0.3567 | 35.4 | 0.589 |

From the above Table, it is apparent that the composition of the invention (e.g. test material IV) is dyed more deeply.

EXAMPLE 8

The yarn (2.0 to 2.3 d) obtained in Example 5 and subjected to various treatments is charged with a load of 1.3 g, and the bending times of the yarn required for snapping are recorded. The results are shown in Table 9 wherein the values are the average on 20 pieces of the yarns.

Table 9

| Test material | Treatment | Weight of load (g) | Number of bending times |
|---|---|---|---|
| V | Spinning and stretching | 1.3 | >10,000 |
| VI |  |  | <10,000 |
| V | Refining, bleaching and treatment with fluorescent dye | 1.3 | 1,086 |
| VI |  |  | >10,000 |
| V | Refining and dyeing | 1.3 | 1,935 |
| VI |  |  | >10,000 |

When the number of bending times is below 3000, the yarn is generally thought to have a good pilling-resistant property for the practical use. Thus, the composition of the invention apprently possesses a high pilling-resistant property. Further, it is notable that the pilling-resistant property of the yarn becomes stronger after various treatments than before various treatments.

What is claimed is:

1. A fireproof, thermoplastic polyester composition having a viscosity and degree of polymerization suitable for melt spinning into filaments, which comprises a polyester and a polyaryl phosphonate incorporated therein in an amount of 0.7 to 4.0 weight % as phosphorus to the polyester, the said polyaryl phosphonate being not less than 6 in the degree of polymerization and containing as its diol component at least one of the aromatic diol compounds of the formulae:

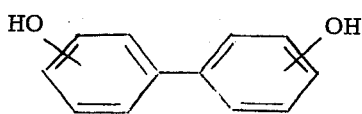

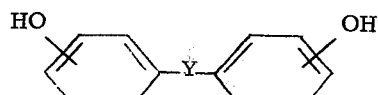

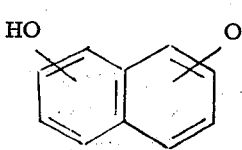

wherein Y is alkylidene or cycloalkylidene having 1 to 6 carbon atoms and the phenyl radicals may bear one or more alkyls.

2. The fireproof, thermoplastic polyester composition according to claim 1, wherein the polyaryl phosphonate is the one prepared by reacting at least one of the aromatic diol compounds of the formulae:

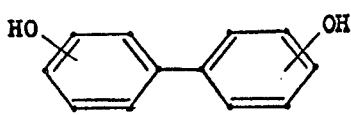

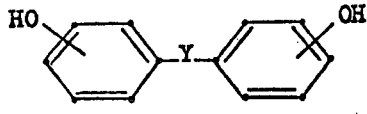

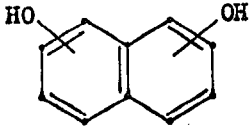

wherein Y is alkylidene or cycloalkylidene having 1 to 6 carbon atoms and the phenyl radicals may bear one or more alkyls with a compound of the formula:

wherein R is aryl and X is chlorine or bromine in approximately equimolar amounts at 100° to 200°C under atmospheric pressure and then at 150° to 25°C under atmospheric or recuced pressure in an inert gas or dry air.

3. The fireproof, thermoplastic polyester composition according to claim 1, wherein the polyaryl phosphonate is the one prepared by surface polymerization of a compound of the formula:

wherein R is aryl and X is chlorine or bromine dissolved in a solvent with at least one of the aromatic diol compounds of the formula:

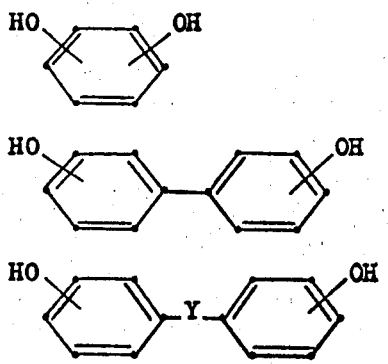

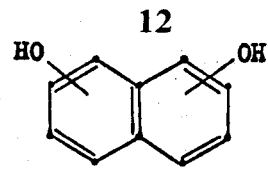

wherein Y is alkylidene or cycloalkylidene having 1 to 6 carbon atoms and the benzene ring may bear one or more alkyls as alkali metal salt(s) dissolved in water while stirring.

4. The fireproof, thermoplastic polyester composition according to claim 1, wherein the polyester is polyethylene terephthalate, fiber-forming copolymerized polyester containing not less than 80 mol of ethylene terephthalate unit, poly-1,4-cyclohexylidenedimethylene terephthalate, polyethylene sebacate or polyethylene adipate.

5. The fireproof, thermoplastic polyester composition according to claim 1, wherein the polyaryl phosphponate is obtained from reaction of at least one aromatic diol selected from the group consisting of hydroquinone, resorcinol, 4,4'-dihydroxybiphenyl, 4,4'-methylenebisphenol, 4,4'-ethylidenebisphenol, 4,4'-isopropylidenebisphenol, 4,4'-cyclohexylidenebisphenol, 2,2'-methylenebisphenol, 1,5-dihydroxynaphthalene, and 2,7-dihydroxynaphthalene, and a compound selected from the group consisting of phenyldichlorophosphine oxide and phenyldibromophosphine oxide.

* * * * *